May 7, 1946. R. SCHILLING 2,399,764
FLUID SEALING DEVICE
Filed March 4, 1938

Inventor
Robert Schilling
By Blackmore, Spencer & Hurt
Attorneys

Patented May 7, 1946

2,399,764

UNITED STATES PATENT OFFICE 2,399,764

FLUID SEALING DEVICE

Robert Schilling, Detroit, Mich., assignor to General Motors Corporation, Detroit, Mich., a corporation of Delaware Application March 4, 1938, Serial No. 193,871

3 Claims. (Cl. 286—11)

This invention relates to fluid sealing devices such as are used in pumps or similar apparatus wherein a shaft which rotates within a housing projects outwardly through a bearing opening formed in the housing, and it is desired to prevent leakage through the clearance which necessarily exists between the shaft and the edge of the opening.

It has heretofore been proposed to employ for this purpose a form of sealing device consisting of an expansible sealing member formed of resilient material adapted to embrace the shaft tightly, and which is expanded by a spring toward the housing, there being a sealing washer of low friction characteristics interposed between the sealing member and the housing since the seal is rorating while the housing is stationary. In such seals provision is usually made to insure that the sealing washer will rotate with the shaft so that there will be no possibility of there being relative rotational movement between the sealing washer and the sealing member, as since the latter is made of resilient material such as rubber or some synthetic composition, it has relatively high friction characteristics and therefore it is undesirable to have any part which bears against it have rotational movement relative to it.

One disadvantage of this form of sealing device is that the entire assembly consisting of the expansible sealing member, the spring, the retaining rings for the spring, and the sealing washer must rotate with the shaft, and since the latter is often operating at relatively high speed, the various parts of the seal assembly must likewise rotate at such speed. This is considered to be objectionable since the parts of the sealing device are subject to deformation through circumferential loads set up by the action of centrifugal force, with the result that the normal operation of the sealing device is sometimes interfered with at high speeds, and the life of some of the parts thereof may be shortened.

It is therefore an object of this invention to provide a sealing device which will have all of the advantages of the above described type of seal, but which will not be subject to its disadvantages. This is accomplished by designing the pump structure and sealing device so that the seal assembly is supported in the housing and is locked in place therein so that none of the parts of the sealing device rotate. This of course not only eliminates the possibility of parts of the sealing device becoming deformed or damaged by being subjected to circumferential loads set up during high speed rotation, but also results in the sealing action of the device being greatly improved because of the fact that the expansible sealing member when not rotating can align itself better to the surface of the parts it bears against, due to the absence of any gyroscopic effect which might tend to interfere with such aligning action.

The above and other objects will be more clearly understood by referring to the following specification and accompanying drawing, in which Fig. 1 is a transverse sectional view through a pump showing my improved fluid sealing device associated therewith.

Figure 1:
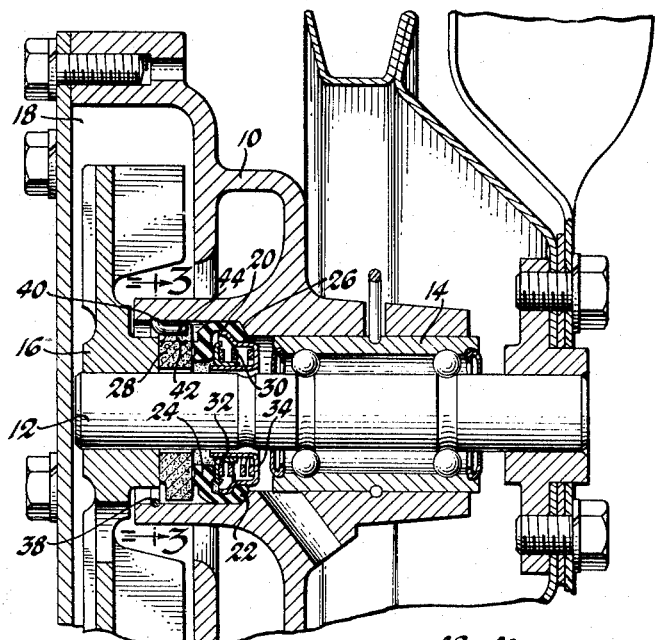

The reference numeral 10 indicates the housing of a water pump, which is shown as being of the type employed on internal combustion engines, but it will be understood that my improved sealing device may be used equally as well on any other type of pump or similar device where it is desired to effect a fluid tight seal between a rotating shaft and a housing from which the shaft projects. The pump shaft 12 is journalled in a bearing 14 mounted in the pump housing, and the pump impeller 16 is pressed or otherwise secured on the shaft 12. The impeller rotates within the pump chamber 18 to force the cooling fluid through the engine jackets in the usual manner.

Figure 2:
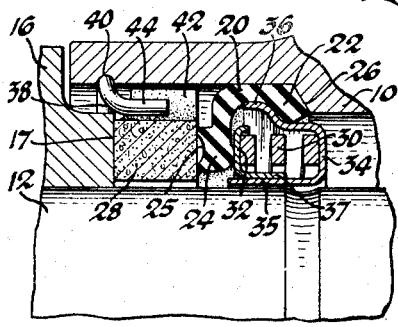
Fig. 2 is an enlarged sectional view of a portion of the sealing device shown in Fig. 1.

My improved sealing device is shown more clearly in Fig. 2, wherein it will be seen that 20 is a sealing member composed of an annular sleeve formed of rubber or any suitable resilient composition material adapted to withstand the action of the heat and deleterious substances present in the fluid being circulated by the pump. Extending inwardly from one end of this sleeve is a relatively short flange 22, while at the opposite end of the sleeve is a much longer flange 24, which likewise extends inwardly toward the shaft. Since the material of which the sleeve and flanges are formed is resilient, the flanges are of course free to flex about the points where they are connected to the sleeve. The pump housing is counterbored to form a shoulder 26, and the sealing member is assembled in this counterbore so that the outer face of the flange 22 bears against the shoulder 26.

Also located within the counterbore of the pump housing and encircling the shaft is a sealing disc or washer 28 formed of any suitable material possessing low friction characteristics, such as carbon, graphite, etc. This sealing washer is interposed between the flange 24 of the sealing member and the end face 17 of the impeller, which face may be machined or otherwise finished to provide a smooth surface for the sealing washer to bear against. If desired, the portion of the flange 24 which bears against the washer 28 may have a groove 25 formed in it to produce two annular ridges on the flange 24, which ridges are of course more easily deformed to effect a tight seal than a large flat surface would be.

Located inside the sealing member is a compression spring 30, one end of which bears against a spring retaining ring 32 which in turn bears against the inside face of the flange 24 on the sealing member, while the other end of the spring bears against another spring retaining ring 34 which is somewhat larger in diameter than the retaining ring 32. As best shown in Fig. 2, it will be seen that the outer edge of the spring retaining ring 34 is flared outwardly as at 36 so that it fits inside of and is adapted to bear against the inner face of flange 22 on the sealing member, while the opposite edge of the retaining ring 34 is formed into cylindrical form as at 35, this last mentioned portion being adapted to fit within a similarly shaped portion 37 on the retaining ring 32, so that the two retaining rings are assembled in telescoping relationship as shown.

The assembly consisting of the spring 30 and the two spring retaining rings 32 and 34 is inserted within the sealing member at the time of manufacture by applying an expanding force to the flange 22 so that it is flexed outwardly a sufficient amount to permit the flared portion 36 of the retaining ring 34 to be inserted inside it, and due to the resiliency of the material of which the sealing member is formed, when the expanding force is released, the flange 22 contracts sufficiently to hold the assembly of the two retaining rings and spring in place inside the sealing member under normal conditions encountered in operation.

Figure 3:
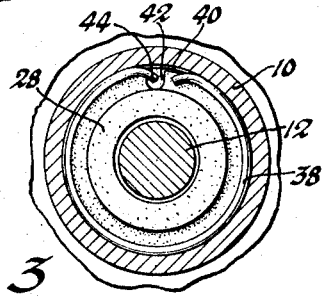
Fig. 3 is a sectional view taken on the line 3—3 of Fig. 1.

To hold the parts of the sealing device in proper position in the pump housing during assembly of the pump structure or when the shaft and impeller are removed, a snap ring 38 is employed. As shown in Fig. 3, this ring is formed of spring wire bent into circular form, and by grasping the ends thereof, it may be compressed to reduce its diameter so that it may be slipped into the counterbore in the pump housing. A groove 40 is formed in the housing adjacent to the surface of the sealing washer which bears against the face of the impeller, and when the ends of the snap ring are released, the ring expands into the groove 40 so that the ring is held in the counterbore so that it may serve as a stop to prevent movement of the seal assembly out of the housing.

It will be seen that the expanding action of the compression spring 30 will tend to force the outwardly flared portion 36 of the spring retaining ring 34 into contact with the flange 22 of the sealing member, and since the shape of the flared portion and the inner face of the flange is such that a camming action takes place, the flange 22 is caused to flex about the point where it is connected to the annular sleeve portion 20 and is forced into firm contact with both the surface of the counterbore and the shoulder 26 in the housing to form a fluid tight seal at these points. The opposite end of the compression spring 30 bears against the spring retaining ring 32 which in turn bears against the inner face of the flange 24 of the sealing member, and this causes this flange to flex about the point where it is connected to the sleeve portion 20 of the sealing member, thereby forcing the flange 24 to be forced firmly against the face of the sealing washer 28 and also causing the opposite face of the sealing washer to be forced with considerable pressure against the face 17 of the impeller.

While the material of which the sealing member is formed is sufficiently resilient as to permit enough flexing of the flanges about the points where they are connected to the sleeve portion of the sealing member to bring about a fluid tight seal between one flange of the sealing member and the housing and between the other flange of the sealing member and the sealing washer, and between the latter and the face of the impeller, it would require the application of considerably more force than that exerted by the spring to flex the flanges an amount sufficient to allow the assembly consisting of the two spring retaining rings to slip out of the sealing member. Therefore the two spring retaining rings and the spring are retained within the sealing member to form a unit assembly without requiring that any special retaining means be provided to hold them together.

Since the friction between the engaging faces of the impeller and the sealing washer is very much less than between the engaging faces of the flange 24 and the sealing washer, the latter will be held against rotation because of this greater friction, and therefore the impeller will rotate against the sealing washer, and in a short time a perfect ground joint will be worn between the two, which will produce a fluid tight seal at this point, and of course since the flange 24 of the sealing member is pressed tightly against the opposite face of the sealing washer by the action of the spring, a fluid tight seal will also be produced at this point. The resiliency of the sealing member permits the sealing washer to align itself properly to take care of variations in the shape or angularity of the face 17 of the impeller, the central opening in the sealing washer being made sufficiently larger than the diameter of the shaft to permit the washer to freely move axially and angularly the necessary amount relative to the shaft to bring about the desired sealing action.

Instead of depending upon the friction between the face of the flange 24 of the sealing member and the face of the sealing washer to keep the washer from rotating, a notch or slot 42 may be formed in the periphery of the sealing washer, as shown in Fig. 3, and one end of the snap ring 38 may be bent over at an angle to form a projection 44 which is adapted to fit into the notch or slot, and it will be readily seen that this will positively prevent rotation of the sealing washer and will insure that there can be no relative rotation between the sealing washer and the sealing member.

It will be observed by referring to Fig. 3 that the snap ring is located far enough away from the sealing washer to permit the latter to move axially toward the face of the impeller a sufficient amount to insure that there will be pressure of the sealing washer against the face of the impeller at all times to bring about a fluid tight seal therebetween, and the fit of the projection 44 on the snap ring into the notch or slot 42 is likewise loose enough so that there will be not interference with the axial or angular movement of the sealing washer toward the impeller within the necessary limits.

It will also be seen that due to the fact that the shaft 12 is rotating while the parts which make up the seal assembly are kept from rotating, it is necessary that sufficient clearance be provided between the cylindrical portion 35 and the shaft, and between the inner edge of the flange 24 of the sealing member and the shaft, to insure that there will be no contact between these parts.

Figure 4:
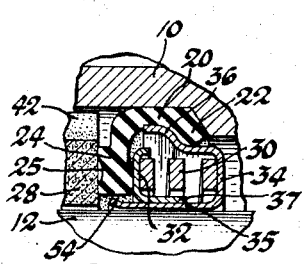
Fig. 4 is a fragmentary view, somewhat similar to Fig. 2, but showing a modification of the sealing device.

In Fig. 4, a modification of the structure is disclosed, this consisting of flaring the edge of the cylindrical portion 35 of the spring retaining ring 34 after the spring 30 has been assembled between the two spring retaining rings 32 and 34. This flaring operation may be done by spinning or otherwise deforming the metal of the ring to form an outwardly extending portion 54 which is larger in diameter than the inside diameter of the cylindrical portion 37 of the spring retaining ring 32. This flared portion 54, while spaced sufficiently from the outer face of the spring retaining ring 32 to prevent its interfering with the normal axial movement of that part during operation of the sealing device, serves as a stop to limit movement of the spring retaining rings away from each other when the sealing device is being handled before assembly into the pump structure. This arrangement may be used to hold the assembly of the seal parts together as a unit if the material of which the sealing member is formed is such that it would not offer sufficient resistance against abnormal flexing of the flanges 22 and 24 about the points where they are connected to the sleeve portion 20 to serve to hold the spring retaining rings and spring inside the sealing member as a unitary assembly. It will be obvious that since movement of the spring retaining rings away from each other is limited by the flared portion 54, these parts cannot be spread apart far enough by the spring to flex the flanges sufficiently to permit the assembly of the spring retaining rings and spring to slip out from between the flanges of the sealing member.

Figure 5:
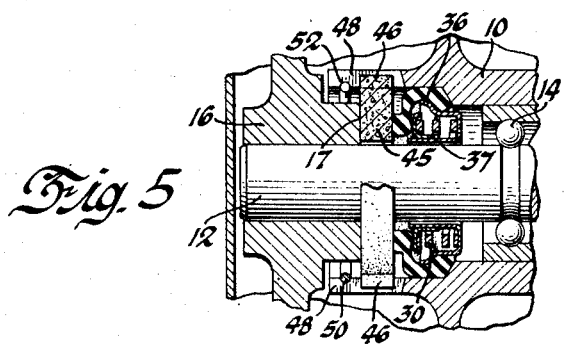
Fig. 5 is a view somewhat similar to Fig. 1, showing another modification of the invention.

Another modification is shown in Fig 5, wherein instead of relying upon the friction between the sealing member and the sealing washer, or upon the projection of the snap ring which fits within the notch or slot in the sealing washer, to keep the latter from rotating, one or more lugs 46 are formed on the periphery of the sealing washer, which in this form is designated by the numeral 45, and these lugs fit within slots 48 which extend axially inward from the end of the pump housing to a point adjacent to where the sealing member is supported in the counterbore in the housing. If desired, a snap ring 50, adapted to expand into a groove 52 formed in the pump housing, may be employed with this structure to hold the seal assembly in place in the pump housing until the shaft and impeller are inserted therein. It will be understood that since the lugs 46 can move axially in the slots 48, the sealing washer 45 is likewise free to move axially a sufficient amount to permit it to align itself properly against the face 17 of the impeller and to maintain the necessary pressure against such face to insure a tight seal at this point, the snap ring 50 being located far enough away to prevent its interfering with such action.

It will be seen from the above that I have provided a fluid sealing device in which all of the parts are held against rotational movement, and consequently none of them are subjected to deformation through circumferential loads being imposed upon them because of high speed rotation, and therefore they not only operate more satisfactorily to effect a tight seal under all conditions, but their life is increased. Since the sealing washer is not rotating, there is no possibility of any gyroscopic action being set up which might interfere with the aligning movement of the washer, and therefore the latter is free to respond immediately to provide any movement necessary to maintain a fluid tight seal against the face of the impeller regardless of the speed at which the pump is operating.

Another advantage of the structure described is that the parts of the sealing device are retained together as a unit without requiring the use of any special securing means, thereby reducing the cost of manufacturing the sealing device by eliminating some parts or lessening the labor involved in the assembly operation. Another advantage of the arrangement shown and described is that the machining operation of the pump housing is simplified over what has heretofore been required, since both the bore for the bearing and the counterbore for the sealing device may be machined at one operation, whereas ordinarily two or more operations are required to machine pump housings to provide the bore for the bearing and a different diameter bore within which the sealing device is mounted. A still further advantage of my improved design is that when it becomes necessary to remove the impeller and shaft from the pump assembly, the shaft must be pressed out of the impeller, which requires the application of considerable pressure to the shaft which pressure is in turn transmitted to the impeller which must be held to resist such pressure. In the usual pump structure where the sealing device is located between the impeller and the pump housing, when such pressure is applied, it is difficult or impossible to prevent the sealing device from becoming crushed or damaged during the disassembling operation, but it will be seen that in my improved arrangement only sufficient clearance to permit free running exists between the end of the housing and the body portion of the impeller, and when during disassembly of the shaft and the impeller from the pump assembly, pressure is applied to the shaft to force it out of the impeller, this slight clearance will immediately be taken up and then the impeller will seat positively against the pump housing, so that no crushing or damaging force can be applied to the sealing device, which therefore may be used over again.

While I have shown and described specific embodiments of my invention, it will be understood of course that various changes in size, shape and details of construction of the parts thereof may be made without departing from the spirit and scope of the appended claims.

I claim:

1. In a fluid seal, a self-contained unit comprising a flexible sleeve of annular formation adapted to enclose a shaft, spaced resilient integral flanges on said sleeve, one of said flanges extending from the sleeve at an angle of about 45° thereto and the other of said flanges extending at an angle of about 90° from said sleeve, a pair of annular spring retaining members concentric with said sleeve and arranged to bear against the inside surfaces of said flanges, and spring means disposed between said spring retaining members and acting through said members to flex said flanges about their connections with the sleeve, the shape of said flanges and spring retaining members being such as to cause one of said flanges to be flexed axially with respect to the center line of said sleeve while the other of said flanges is flexed outwardly in a radial direction at approximately 45° with respect to said sleeve.

2. In a fluid seal, a self-contained unit comprising a sleeve of rubber-like material having an annular formation and adapted to enclose a shaft, said sleeve including two spaced resilient integral flanges thereon one of which is disposed at each end of said sleeve, a pair of spring retaining members adapted to fit within said sleeve and engage said flanges, one of said members having a deep cup-like formation whereby a portion of the member extends a substantial distance beyond the sleeve, and a spring disposed within the sleeve and between said members, one of said flanges being substantially radial and the other being inclined toward the axis of the sleeve and away from said one flange so that the action of the spring causes said one flange to flex axially with respect to the shaft while said other flange is flexed axially and outwardly in a direction at an angle to the center line of said shaft, the cup-like structure of said one spring retaining member permitting the use of a spring having a length greater than the internal distance between said flanges.

3. In combination with a housing and a shaft rotatably supported therein, said housing having a bore therethrough, an extensible sealing member disposed about the shaft and contained within the housing and adapted to abut the housing on a conical shoulder therein at one end thereof, a sealing washer disposed about the shaft and between a portion of the shaft and said member, spring means within the said member for extending the member axially of the shaft and into sealing engagement with the housing shoulder and the washer and for sealing and engaging the washer to said portion of the shaft, said spring means being of appreciably greater length than said sealing member and extending into the bore of said housing, and a pair of spring retainers one of which is entirely enclosed within said member and the other of which is only partially enclosed within said member for containing said spring and for transmitting the compression of said spring to said sealing member.

ROBERT SCHILLING.